(12) United States Patent  (10) Patent No.: US 9,273,545 B2
Bolshakov et al.  (45) Date of Patent: Mar. 1, 2016

(54) USE OF LAMB AND SH ATTENUATIONS TO ESTIMATE CEMENT VP AND VS IN CASED BOREHOLE

(71) Applicant: Baker Hughes Incorporated, Houston, TX (US)

(72) Inventors: Alexei Bolshakov, Pearland, TX (US); Douglas Patterson, Spring, TX (US); Edward Domangue, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 561 days.

(21) Appl. No.: 13/726,215

(22) Filed: Dec. 23, 2012

(65) Prior Publication Data

US 2014/0177389 A1  Jun. 26, 2014

(51) Int. Cl.
*G01V 1/50* (2006.01)
*E21B 47/00* (2012.01)
*G01V 1/28* (2006.01)

(52) U.S. Cl.
CPC .............. *E21B 47/0005* (2013.01); *G01V 1/50* (2013.01); *G01V 1/284* (2013.01)

(58) Field of Classification Search
CPC .............................. G01V 1/50; E21B 47/0005
USPC ............................................ 367/35; 181/105
See application file for complete search history.

(56) References Cited

U.S. PATENT DOCUMENTS

| | | | |
|---|---|---|---|
| 5,864,772 A | 1/1999 | Alvarado et al. | |
| 6,021,198 A | 2/2000 | Anigbogu et al. | |
| 6,483,777 B1 | 11/2002 | Zeroug | |
| 7,150,317 B2 | 12/2006 | Barolak et al. | |
| 7,525,872 B2 | 4/2009 | Tang et al. | |
| 7,606,666 B2 | 10/2009 | Repin et al. | |
| 7,663,969 B2 | 2/2010 | Tang et al. | |
| 7,681,450 B2 | 3/2010 | Bolshakov et al. | |
| 7,697,375 B2 | 4/2010 | Reiderman et al. | |
| 7,773,454 B2 | 8/2010 | Barolak et al. | |
| 7,787,327 B2 | 8/2010 | Tang et al. | |
| 7,996,199 B2 | 8/2011 | Sayers et al. | |
| 8,061,206 B2 | 11/2011 | Bolshakov et al. | |
| 2003/0156494 A1* | 8/2003 | McDaniel et al. | 367/35 |
| 2005/0205248 A1 | 9/2005 | Barolak et al. | |
| 2006/0133205 A1* | 6/2006 | Van Kuijk et al. | 367/35 |

(Continued)

OTHER PUBLICATIONS

PCT International Search Report and Written Opinion, Apr. 9, 2014, Intl. Appl. Serial No. PCT/US2013/077615 (9 unnumbered pages).

(Continued)

*Primary Examiner* — Ian J Lobo
(74) *Attorney, Agent, or Firm* — Chowdhury Law Group, P.C.

(57) ABSTRACT

A method of determining properties of a bonding material disposed outside of a casing in a borehole includes at least two of the following three pairs of operations: (1) inducing an acoustic wave in the casing, and measuring attenuation of the acoustic wave, by pulse-echo or other cement bond logging measurement; (2) inducing an SH wave in the casing, and measuring attenuation of the SH wave; and (3) inducing a Lamb wave in the casing, and measuring attenuation of the Lamb wave. (2) and/or (3) may be performed by an electromagnetic acoustic transducer. The method further includes determining the shear velocity or shear impedance and the compressional velocity or compressional impedance of the bonding material based on appropriate ones of the measurements. The bonding material may be cement.

17 Claims, 15 Drawing Sheets

(56) References Cited

U.S. PATENT DOCUMENTS

| | | | |
|---|---|---|---|
| 2006/0233048 A1* | 10/2006 | Froelich et al. | 367/35 |
| 2007/0206439 A1 | 9/2007 | Barolak et al. | |
| 2008/0112262 A1 | 5/2008 | Tang et al. | |
| 2009/0231954 A1 | 9/2009 | Bolshakov et al. | |
| 2010/0107754 A1 | 5/2010 | Hartog et al. | |

OTHER PUBLICATIONS

F. Garcia-Osuna, A.L. Podio, E.L. Hixson, A.R. Gregory, "Acoustic and Signal Processing Techniques to Estimate Rock Properties Through Casing: Preliminary Results," SPE Latin American and Caribbean Petroleum Engineering Conference, Mar. 25-28, 2001, Buenos Aires, Argentina, pp. 1-9 (SPE 69604).

D.T. Georgi, R.G. Heavysege, S.T. Chen, E.A. Eriksen, "Application of Shear and Compressional Transit-time Data to Cased-hole Carbonate Reservoir Evaluation," Journal: The Log Analyst, vol. 32, No. 2, Mar.-Apr. 1991, pp. 129-143.

A.O. Bolshakov, E.J. Domangue, J.G. Barolak, D.J. Patterson, "Use of Electromagnetic Acoustic Transducers (EMATS) for Cement Bond Logging of Gas Storage Wells," Review of Progress in Quantitative Nondestructive Evaluation: 34th Annual Review of Progress in Quantitative Nondestructive Evaluation. AIP (American Institute of Physics) Conference Proceedings, vol. 975, pp. 809-816 (2008).

A.O. Bolshakov, J. Zhao, E.J. Domangue, V.S. Dubinsky, D.J. Patterson, "Application of Special Filtering Techniques in the Analysis of EMAT Data," Review of Progress in Quantitative Nondestructive Evaluation: Proceedings of the 35th Annual Review of Progress in Quantitative Nondestructive Evaluation. AIP (American Institute of Physics) Conference Proceedings, vol. 1096, pp. 596-603 (2009).

* cited by examiner

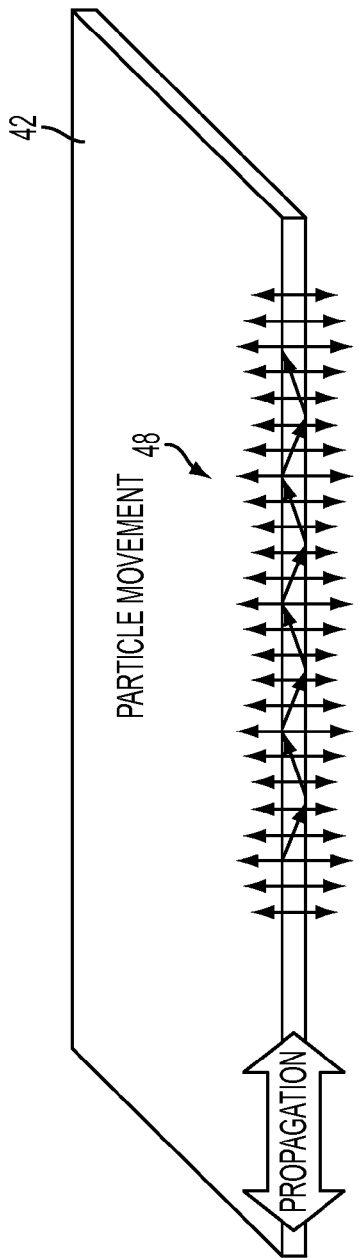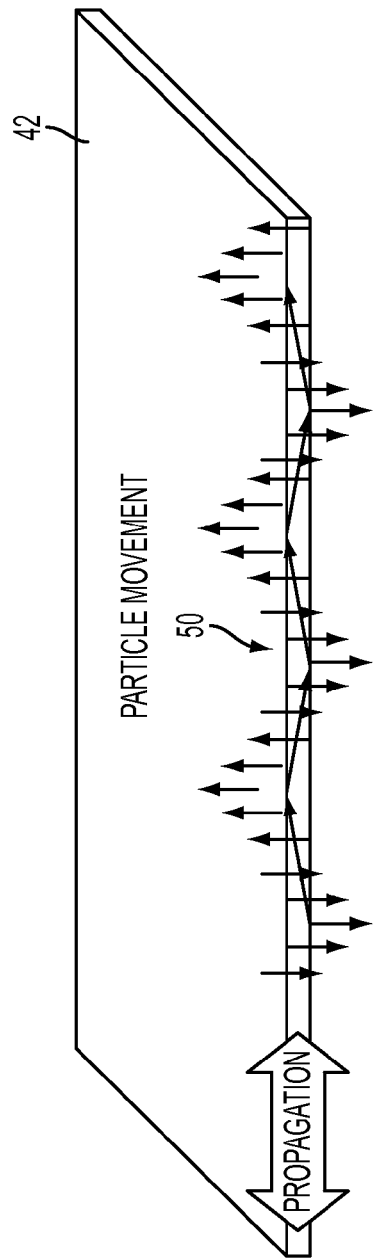

FIG. 5

USE OF LAMB AND SH ATTENUATIONS TO ESTIMATE CEMENT VP AND VS IN CASED BOREHOLE

CROSS-REFERENCE TO RELATED APPLICATIONS

Not applicable.

STATEMENT REGARDING FEDERALLY SPONSORED RESEARCH

Not applicable.

TECHNICAL FIELD OF THE INVENTION

The present disclosure relates generally to systems and methods for evaluating cement disposed outside of a casing in a borehole. More particularly, the disclosure relates to use of Lamb and SH wave attenuation measurements to determine cement properties such as compressional velocity and shear velocity.

BACKGROUND

In the process of extracting hydrocarbons, e.g., petroleum, from beneath the surface of the earth, wells are drilled and steel pipe (casing) is placed into the drilled hole (wellbore or borehole). Cement is then pumped into the annular space between the casing and the rock wall of the borehole (formation). The cement serves two major purposes. First, it transfers stress from the casing to the formation, increasing the effective strength and working pressure of the casing. Second, it serves to isolate vertically adjacent zones within the formation, preventing migration of liquids and gases up the wellbore between the formation and the casing, from one zone to the next. Accordingly, it is important to assure the quality of the cement both during completion of the well and during its producing life. Acoustic cement evaluation devices (cement bond logs, or CBL) conveyed by a cable (wireline) to move the tools up and down in the borehole have been the primary device to provide this assurance. The principle of evaluation is based on the loss of energy over time or distance of an acoustic wave excited in the casing. One area of conventional focus has been on determining whether cement is present outside the casing, e.g., to determine whether only fluid is present between the casing and the formation (free pipe), whether the space between the casing and the formation is filled with cement bonded to the casing (fully cemented pipe), or whether a small gap, filled with fluid, exists between the cement and casing (micro-annulus). However, conventional techniques are unable to adequately evaluate properties of the cement, such as properties indicative of the strength of the cement.

SUMMARY

Embodiments of the present invention provide systems and methods for evaluating cement disposed outside of a casing in a borehole, which address the aforementioned area for improvement and provide various advantages.

According to a first aspect of the invention, there is provided a method of determining properties of a bonding material disposed outside of a casing in a borehole. The method includes inducing an acoustic wave in the casing; measuring attenuation of the acoustic wave; determining the compressional velocity or compressional impedance of the bonding material based on the measured attenuation of the acoustic wave; inducing an SH wave in the casing; measuring attenuation of the SH wave; and determining the shear velocity or shear impedance of the bonding material based on the measured attenuation of the SH wave.

According to a second aspect of the invention, there is provided a method of determining properties of a bonding material disposed outside of a casing in a borehole. The method includes inducing an SH wave in the casing; measuring attenuation of the SH wave; determining the shear velocity or the shear impedance of the bonding material based on the measured attenuation of the SH wave; inducing a Lamb wave in the casing; measuring attenuation of the Lamb wave; generating at least one Lamb attenuation curve that has a value that satisfies the measured attenuation of the Lamb wave; and determining the compressional velocity or the compressional impedance of the bonding material based on the at least one generated Lamb attenuation curve and the measured attenuation of the Lamb wave.

According to a third aspect of the invention, there is provided a method of determining properties of a bonding material disposed outside of a casing in a borehole. The method includes inducing an acoustic wave in the casing; measuring attenuation of the acoustic wave; determining the compressional velocity or compressional impedance of the bonding material based on the measured attenuation of the acoustic wave; inducing a Lamb wave in the casing; measuring attenuation of the Lamb wave; and determining the shear velocity or shear impedance of the bonding material based on (a) the measured attenuation of the Lamb wave and (b) the determined compressional velocity or compressional impedance of the bonding material.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 2A and 2B are schematic illustrations of propagation and particle movement of a symmetric and an asymmetric Lamb wave, respectively, in a plate, in accordance with some embodiments;

FIG. 5 is a schematic illustration of waveforms of different modes of SH waves, in accordance with some embodiments;

NOTATION AND NOMENCLATURE

Certain terms are used throughout the following description and claims to refer to particular system components and configurations. As one skilled in the art will appreciate, the same component may be referred to by different names. This document does not intend to distinguish between components that differ in name but not function. In the discussion in this specification and in the claims appended hereto, the terms "including" and "comprising" are used in an open-ended fashion, and thus should be interpreted to mean "including, but not limited to . . . ."

DETAILED DESCRIPTION

The foregoing description of the figures is provided for the convenience of the reader. It should be understood, however, that the presented embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described or illustrated in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Figure 1:
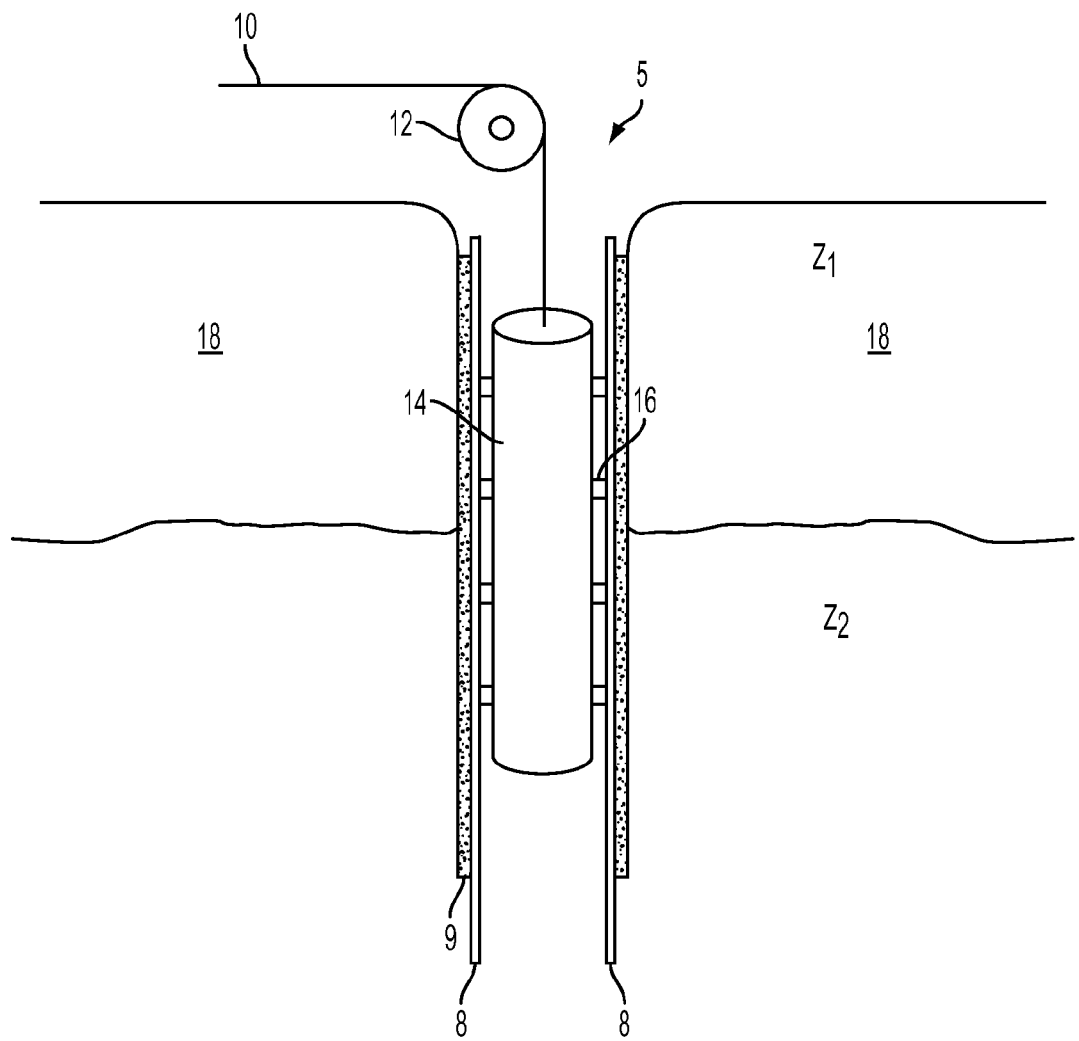
FIG. 1 illustrates a partial cutaway side view of a wellbore including a downhole logging tool disposed therein, in accordance with some embodiments.

FIG. 1 illustrates a partial cutaway side view of a wellbore including a downhole logging tool disposed therein, in accordance with some embodiments. As illustrated in FIG. 1, wellbores typically comprise casing 8 set within the wellbore 5, where the casing 8 is bonded to the wellbore 5 by adding cement 9 within the annulus formed between the outer diameter of the casing 8 and the inner diameter of the wellbore 5. The cement bond not only adheres to the casing 8 within the wellbore 5, but also serves to isolate adjacent zones (e.g., $Z_1$ and $Z_2$) within an earth formation 18. Isolating adjacent zones can be important, e.g., when one of the zones contains oil or gas and the other zone includes a non-hydrocarbon fluid such as water. Should the cement 9 surrounding the casing 8 be defective and fail to provide isolation of the adjacent zones, water or other undesirable fluid can migrate into the hydrocarbon producing zone thus diluting or contaminating the hydrocarbons within the producing zone, and increasing production costs, delaying production or inhibiting resource recovery.

To detect possible defective cement bonds, downhole tools 14 have been developed for analyzing the integrity of the cement 9 bonding the casing 8 to the wellbore 5. These downhole tools 14 are lowered into the wellbore 5 by wireline 10 in combination with a pulley 12 and (in some cases where the wellbore 5 is located on land rather than on the seafloor) a surface truck (not shown). Downhole tools 14 typically include transducers 16 disposed on their outer surface. These transducers 16 are generally capable of emitting acoustic waves into the casing 8 and recording the amplitude of the acoustic waves as they travel, or propagate, across the casing 8. Characteristics of the cement bond, such as its efficacy, integrity and adherence to the casing, can be determined by analyzing characteristics of the acoustic wave such as attenuation. Transducers 16 are typically formed to be acoustically coupled to the fluid in the borehole, although there now exist tools, such as certain electromagnetic transducers discussed below, that do not require acoustic coupling to the fluid and thus can operate in gas-filled boreholes.

The use of transducers 16 to measure cement bond characteristics may be referred to as acoustic cement bond log (CBL) technologies. Currently existing acoustic CBL technologies produce cement maps based on measured attenuations or measured signal decay, as in pulse-echo measurements. Such measurements rely heavily on cement acoustic impedance (a product of cement density and cement compressional velocity) and do not directly measure anything that depends on cement shear velocity alone. Consequently, one may be able to obtain only an estimation of cement compressional velocity from those measurements, while cement shear properties remain uncharacterized. According to embodiments of the present invention, various combinations of traditional CBL or pulse echo measurements, Lamb wave attenuation measurements, and SH wave attenuation measurements may be employed, which allow for direct determination or estimation of both compressional and shear velocities of the cement and, therefore, allow for calculation of both compressional and shear elastic moduli of cement in a cased borehole.

Lamb waves propagate in solid plates. They are elastic waves whose particle motion lies in the plane that contains the direction of wave propagation and the plate normal (the direction perpendicular to the plate). FIGS. 2A and 2B are schematic illustrations of Lamb wave motion in a plate (wave medium), showing propagation and particle movement of a symmetric Lamb wave 48 and an asymmetric Lamb wave 50, respectively, in accordance with some embodiments. In each of these figures the wave motion is illustrated by a series of vertical arrows that demonstrate the amplitude of the wave motion as well as oblique arrows pointing along the edge of the wave medium illustrating the propagation of the wave passing through the wave medium. Lamb waves are similar to longitudinal waves, with compression and rarefaction, and they are bound together by the sheet or plate surface causing a wave guide effect. Lamb waves can be a complex vibrational wave capable of traveling through the entire thickness of the wave medium 42. Propagation of the Lamb waves is dependent upon density, elasticity, and material properties of the wave medium. These waves are also influenced a great deal by the frequency and the material thickness. With Lamb waves, many modes of particle vibration are possible, but the two most common are the symmetrical and the asymmetrical modes. The frequency and wavelengths of the induced Lamb waves can be chosen based on the characteristics of the particular transducer creating the waves as well as the wave modes used. It is within the scope of skilled artisans to choose such frequencies and wavelengths. Lamb waves can be induced by piezo-electric devices, electromagnetic acoustic transducers (EMAT), and wedge type transducers.

Figure 3A:
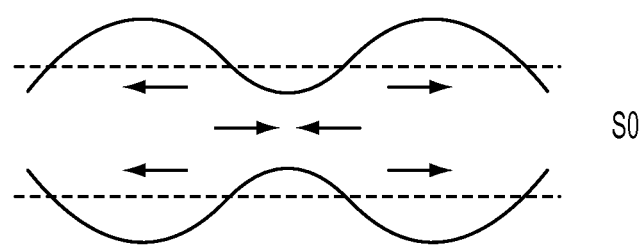
FIGS. 3A and 3B are schematic illustrations of aspects of motion of a symmetric and an asymmetric Lamb wave, respectively, through a plate, in accordance with some embodiments.
Figure 3B:
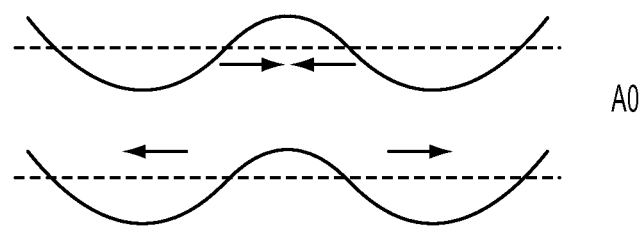

Lamb waves may result from the constructive interference of P (compressional) and $S_v$ (shear vertical) types of waves. When introduced into a well casing, these waves typically propagate around the circumference or axis of the casing. However, such propagation is not limited to circumferential travel, but also includes axial travel, propagation in a helical pattern, and any other pattern of wave propagation through and/or along casing. The first, or zero-order, symmetric mode ($S_0$) of the Lamb wave may be referred to as an extensional or dilatational wave, while the first, or zero-order, asymmetric mode ($A_0$) may be referred to as a flexural mode. Subsequent symmetric modes of the Lamb wave may be designated $S_1$, $S_2$, etc., while subsequent asymmetric modes of the Lamb wave may be designated $A_1$, $A_2$, etc FIGS. 3A and 3B are schematic illustrations of further aspects of motion of a symmetric and an asymmetric Lamb wave, respectively, through a plate, in accordance with some embodiments. FIG. 3A depicts the $S_o$ mode, and FIG. 3B depicts the $A_0$ mode. In these figures, the horizontal lines indicate the top and bottom surfaces of the plate (wave medium). As represented by the arrows, symmetrical Lamb waves move in a symmetrical fashion about the median plane of the plate, hence the name "extensional" mode, as the wave is "stretching and compressing" the plate in the wave motion direction. Similarly, the arrows show how the asymmetrical Lamb waves move in an asymmetrical fashion about the median plane of the plate, whereby the body of the plate "bends" as the two surfaces move in the same direction, whence the name "flexural" mode.

Figure 4:
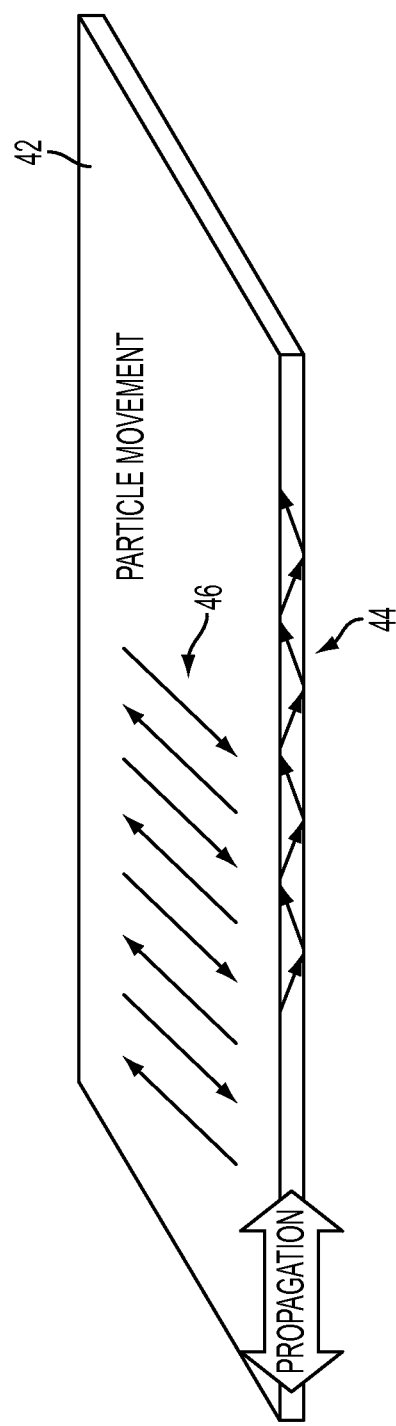
FIG. 4 is a schematic illustration of propagation and particle movement of an SH wave in a plate, in accordance with some embodiments.

SH waves, or horizontal shear waves, are shear waves polarized in the horizontal plane. These waves are elastic waves that propagate in solid plates and whose particle motion is parallel to the plate and perpendicular to the direction of wave propagation. They can also be referred to as transversely polarized shear waves (TPSW). FIG. 4 is a schematic illustration of propagation and particle movement of an SH wave in a plate (wave medium), in accordance with some embodiments. In FIG. 4, arrows 44 illustrate how the shear wave propagates through the wave medium 42, while arrows 46 demonstrate how a horizontal shear wave displaces particles within medium 42. As shown, the particle displacement is in the horizontal plane of the medium 42 in which the wave is traveling. The frequencies and wavelengths of induced SH waves can be chosen based on the characteristics of the particular transducer creating the waves as well as the wave modes used. It is within the scope of skilled artisans to choose such frequencies and wavelengths. Examples of acoustic sources for creating shear waves include electromagnetic acoustic transducers as well as wedge type transducers.

Figure 5:
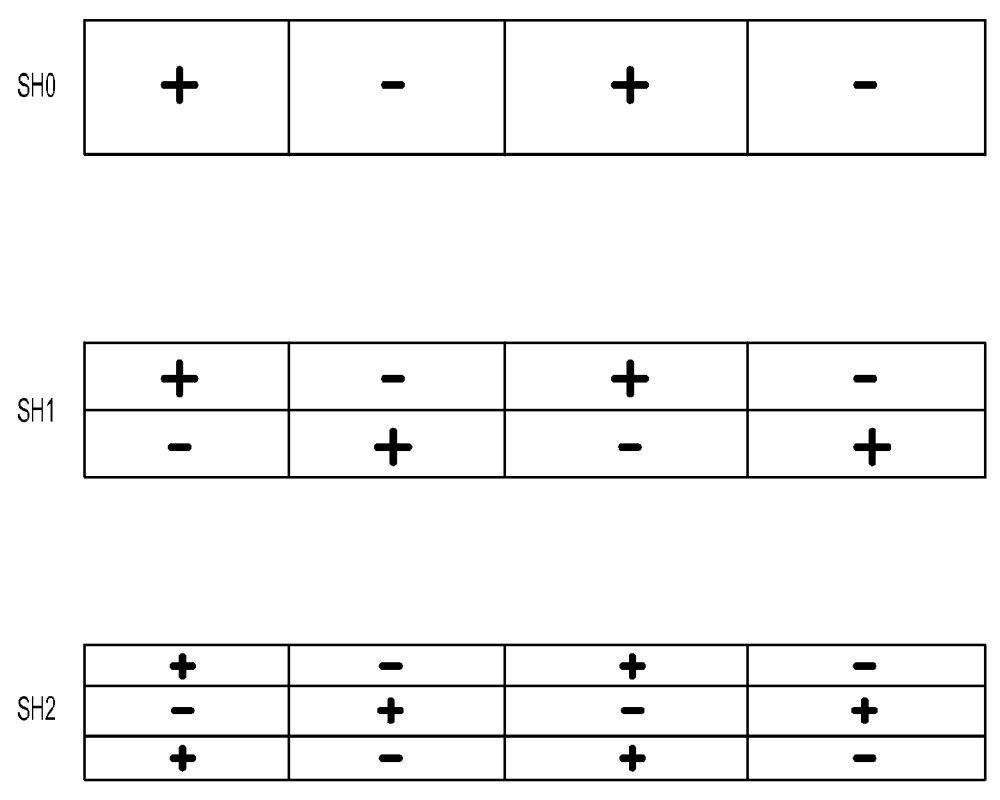

FIG. 5 is a schematic illustration of waveforms of different modes of SH waves, in particular, $SH_0$, $SH_1$, $SH_2$, in accordance with some embodiments. Normal displacement of the particles, as indicated by arrows 46 in FIG. 4, is here shown by the plus (+) signs indicating displacement perpendicularly outward from the plane of the paper and the minus (−) signs indicating displacement perpendicularly into the plane of the paper. Of course, FIG. 5 illustrates for each mode only a portion of the periodic wave.

Method embodiments of the present invention were demonstrated by the present inventors using a model. The model consisted of 8 mm thick steel plate (i.e., casing) with fluid on one side and cement on the other side. The following properties were used in the modeling: Steel Plate: density ($\rho^{pl}$) 7.8 g/cc, compressional velocity ($V_p^{pl}$) 5930 msec, shear velocity ($V_s^{pl}$) 3250 msec; Fluid: density ($\rho^{fl}$) 1.0 g/cc, compressional velocity ($V_p^{fl}$) 1500 msec; Cement: density ($\rho^{cem}$) 1.8 g/cc, varying compressional ($V_p^{cem}$) and shear ($V_s^{cem}$) velocities with various Poisson's ratios, where the Poisson's ratio is a function of compressional and shear velocities. In working with the model, the intent was to demonstrate how the cement compressional velocity ($V_p^{cem}$) and shear velocity ($V_s^{cem}$) can be obtained from certain measurements (discussed below) assuming that all the other properties described above are known. To be sure, in a real logging situation only the casing properties are generally known, while casing thickness and fluid properties inside the casing are generally not known. However, these properties can be derived from additional measurements and in the model it was assumed that everything described above was known except for the compressional and shear velocities of the cement ($V_p^{cem}$ and $V_s^{cem}$). With regard to the model, it was also assumed that cement is present behind the casing and that there was no micro-annulus. In the calculations of Lamb and SH attenuations a constant wavelength of 0.5 inches (12.7 mm) was assumed.

According to method embodiments of the present invention, a combination of any two of the following three measurements, or alternatively all three measurements, may be used: (1) regular CBL measurement or pulse-echo measurement; (2) measurement of SH (Love) wave attenuation; and (3) measurement of Lamb wave attenuation. Each of these types of measurements is described in turn below.

Figure 6:
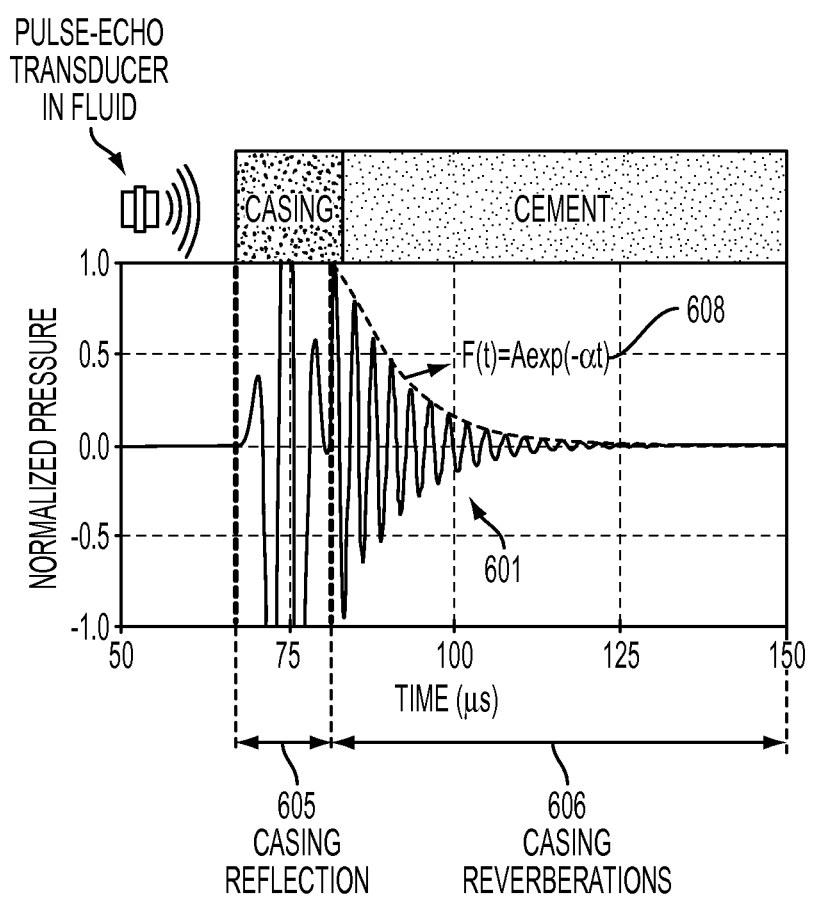
FIG. 6 is a graph illustrating a modeled example of a response signal obtained in a pulse-echo measurement, in accordance with some embodiments.

(1) Regular CBL measurement or pulse-echo measurement. In this case the response obtained from the measurement depends solely on the acoustic impedance of the cement behind the casing (the product of $\rho^{cem}$ and $V_p^{cem}$). In working with the model, pulse-echo measurements were taken, although other CBL measurements may be employed, as will be understood by one of ordinary skill in the art. FIG. 6 is a graph illustrating a modeled example of a response signal obtained in a pulse-echo measurement, in accordance with some embodiments. As shown in the figure, the signal 601 contains the casing reflection 605 (first part of the signal) followed by casing reverberations 606. One way to obtain cement properties from the signal is to fit the reverberations' decay to an exponential function 608. As shown, these reverberations have an exponential decay given by the following:

$$F(t) = A\exp(-\alpha t) = A\exp\left(-|\ln(R_1 R_2)|\frac{V_p^{pl}}{2d}t\right), \quad (1)$$

where t is time, A is a proportionality coefficient, d is the casing thickness, and $R_1$ and $R_2$ are reflection coefficients between the casing and the fluid and between the casing and the cement, respectively, given by the following:

$$R_1 = \frac{\rho^{pl} V_p^{pl} - \rho^{fl} V_p^{fl}}{\rho^{pl} V_p^{pl} + \rho^{fl} V_p^{fl}}, \quad (2)$$

$$R_2 = \frac{\rho^{cem} V_p^{cem} - \rho^{pl} V_p^{pl}}{\rho^{cem} V_p^{cem} + \rho^{pl} V_p^{pl}}.$$

Figure 7:
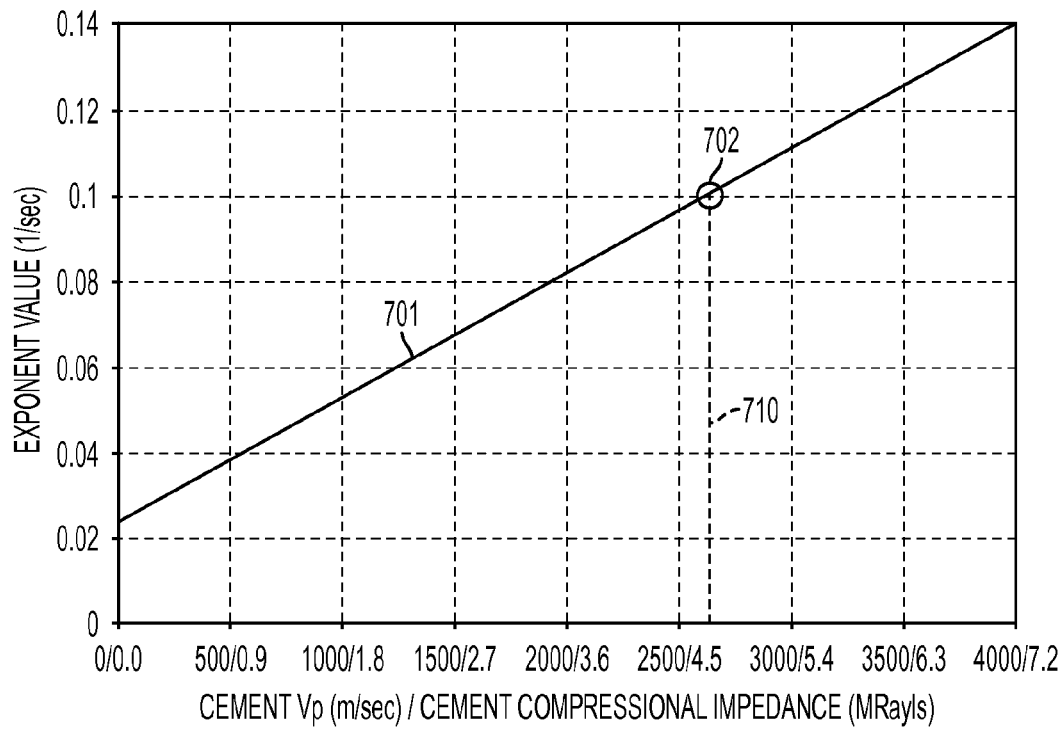
FIG. 7 is a graph illustrating dependence of the value of an exponential term of a function characterizing a pulse-echo response signal on cement compressional properties, in accordance with some embodiments.

FIG. 7 is a graph illustrating the dependence of the exponential term α (of the function F(t) characterizing the pulse-echo response signal) on compressional properties of the cement behind the casing, given the specified parameters, in accordance with some embodiments. Thus, measurement of this parameter allows for determination of cement compressional velocity $V_p^{cem}$ or alternatively cement compressional impedance $Z_p^{cem} = \rho^{Cem} V_p^{cem}$ if the cement density is not known. For example, in FIG. 7, the measured value of 0.1 for the exponential term α (y-axis) corresponds to a cement compressional velocity of 2640 msec or cement compressional impedance of 4.75 MRayls (x-axis), as indicated by the circled point 702 on the response curve 701, from which the dashed vertical line 710 indicates the compressional velocity and compressional impedance values (it will be noted that the x-axis shows two different quantities, namely, compressional velocity and compressional impedance, not a ratio of the one to the other——the slash (/) does not indicate division). As will be understood by one of ordinary skill in the art, cement properties may be obtained from the response signal 601 of FIG. 6 by ways other than fitting the reverberations' decay to an exponential function, which has been described here.

Figure 8:
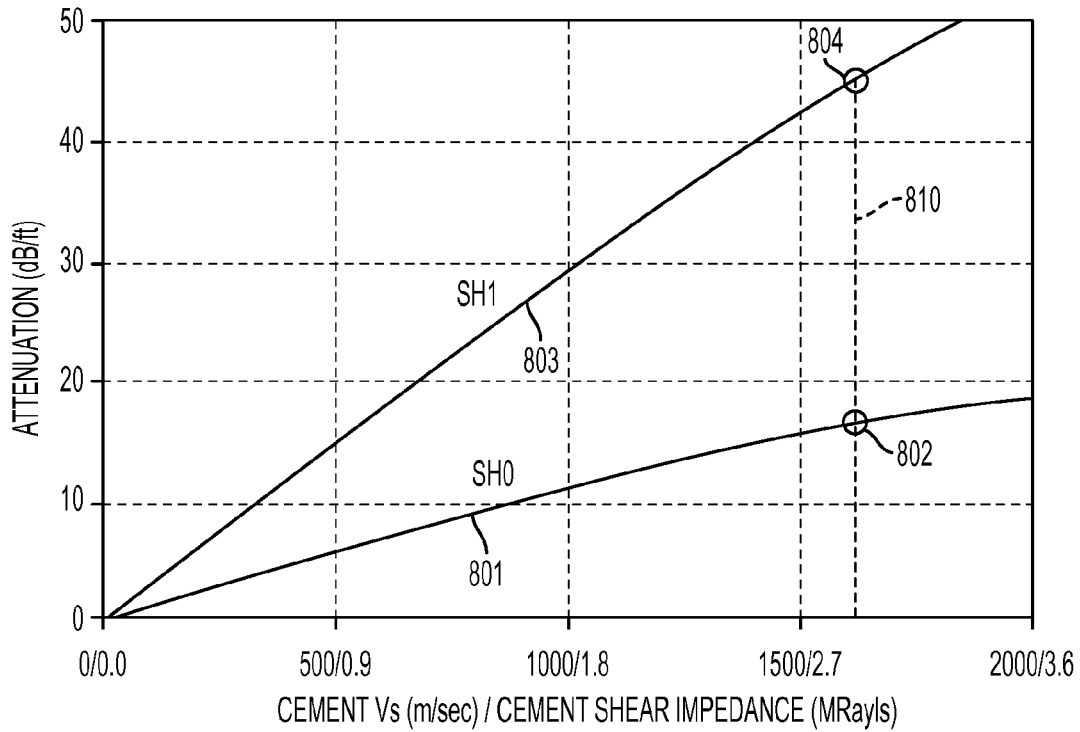
FIG. 8 is a graph illustrating SH wave ($SH_0$ mode and $SH_1$ mode) attenuation as a function of cement shear properties, in accordance with some embodiments.

(2) Measurement of SH (Love) wave attenuation. Love waves are SH waves propagating in the layer. In the case of cemented casing the attenuation of these waves depends solely on cement shear impedance and cement density provided that casing properties and thickness are known. The characteristics of Love (SH) waves do not depend on the fluid properties in the described model. FIG. 8 is a graph illustrating SH wave ($SH_0$ mode and $SH_1$ mode) attenuation as a function of cement shear properties (for 8 mm thick casing per the described model), in accordance with some embodiments. Thus, FIG. 8 shows the dependence of Love (SH) wave attenuation (modes $SH_0$ and $SH_1$) on cement shear properties. It is noted that method embodiments of the present invention are not restricted to the illustrated modes but may be performed using any other SH mode. Measurement of the attenuation allows for determination of cement shear velocity or alternatively cement shear impedance if the cement density is not known. For example, in FIG. 8, the measured value of attenuation of 16.3 dB/ft for mode $SH_0$ or 45.1 dB/ft for mode $SH_1$ (y-axis) corresponds to a cement shear velocity of 1620 msec or cement shear impedance of 2.92 MRayls (x-axis), as indicated by the circled points 802, 804 on the two attenuation curves 801, 803, respectively, from which the dashed vertical line 810 indicates the shear velocity and shear impedance values (it will be noted that the x-axis shows two different quantities, namely, shear velocity and shear impedance, not a ratio of the one to the other—the slash (/) does not indicate division).

Figure 9:
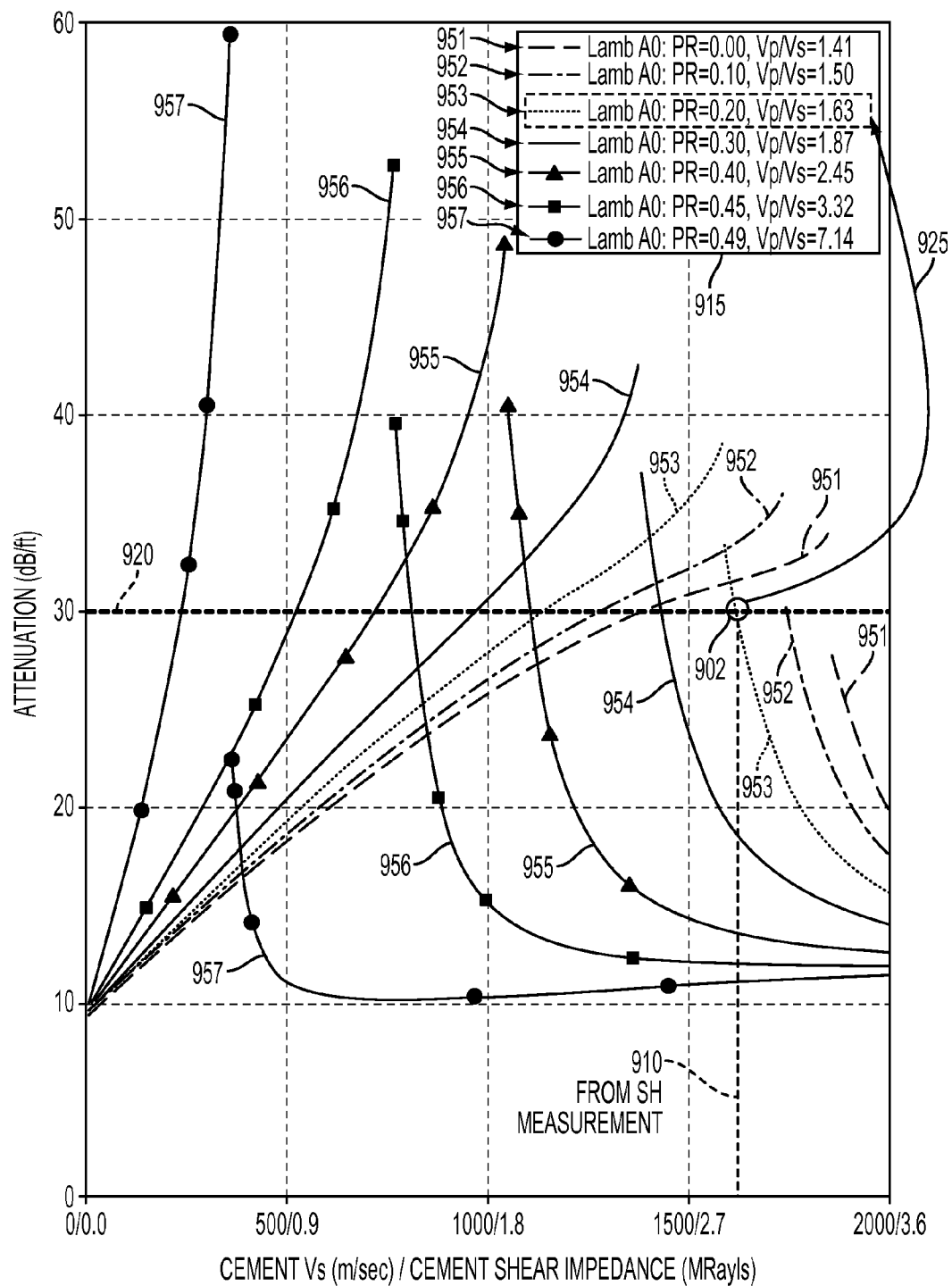
FIG. 9 is a graph illustrating Lamb wave ($A_0$ mode) attenuation as a function of cement shear properties, for various cements with different Poisson's ratios, in accordance with some embodiments.
Figure 10:
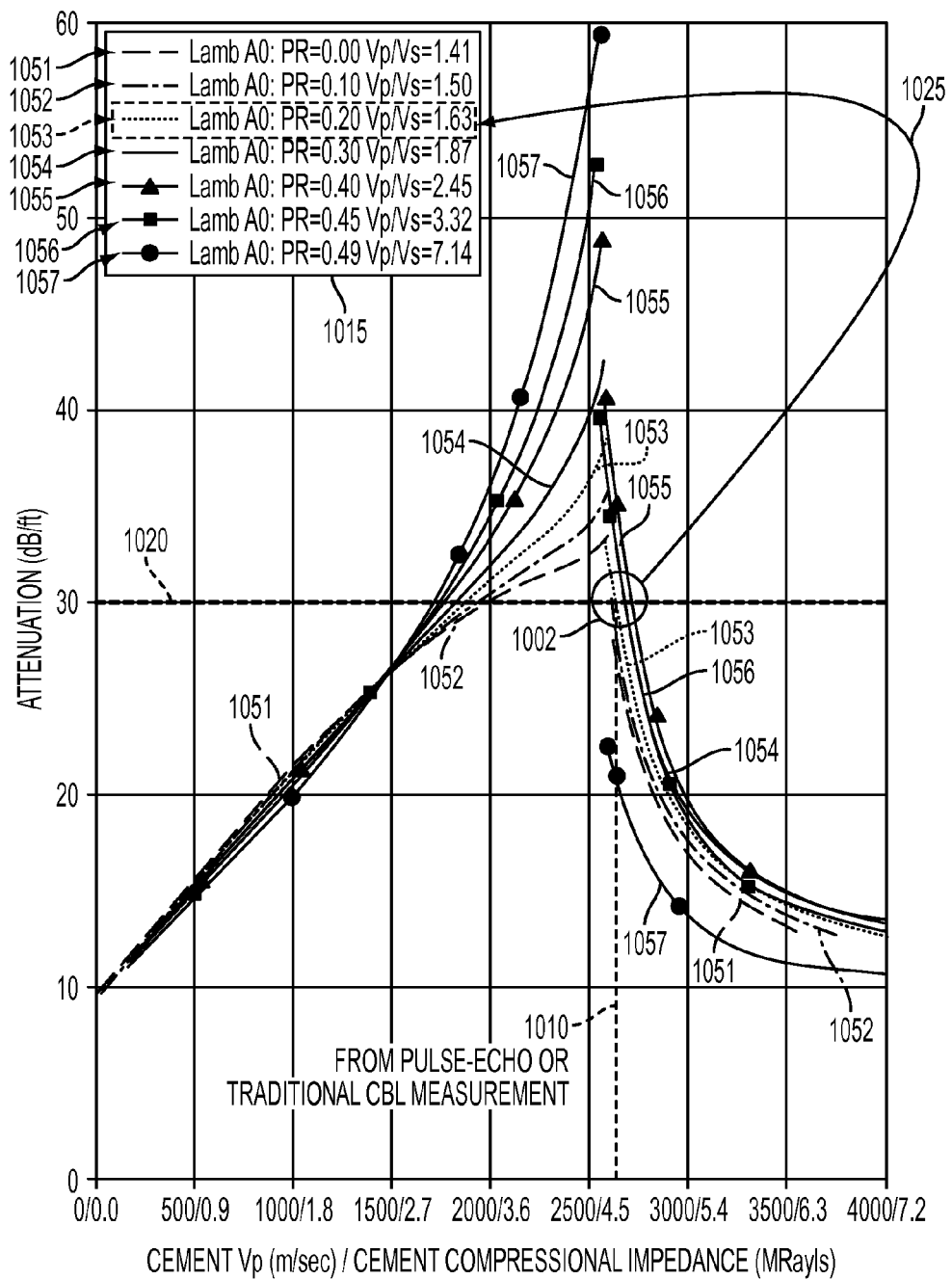
FIG. 10 is a graph illustrating Lamb wave ($A_0$ mode) attenuation as a function of cement compressional properties, for various cements with different Poisson's ratios, in accordance with some embodiments.

(3) Measurement of Lamb wave attenuation. As noted, Lamb waves consist of shear (specifically, SV, or shear vertical) and compressional P waves propagating in a layer. In the case of cemented casing the attenuation of these waves depends on cement compressional velocity and cement shear velocity as well as cement density provided that all the other properties in the described model are known. FIG. 9 is a graph illustrating Lamb wave ($A_0$ mode) attenuation as a function of cement shear properties (shear velocity or shear impedance), for various cements with different Poisson's ratios (and 1.8 g/cc density, per the model), in accordance with some embodiments, while FIG. 10 is a graph illustrating Lamb wave ($A_0$ mode) attenuation as a function of cement compressional properties (compressional velocity or compressional impedance), for various cements with different Poisson's ratios (and 1.8 g/cc density, per the model), in accordance with some embodiments. Thus, FIG. 9 shows the dependence of Lamb mode $A_0$ (anti-symmetric $0^{th}$ mode) on the shear properties of cement for cements with different Poisson's ratios, while FIG. 10 shows the dependence of Lamb mode $A_0$ (anti-symmetric $0^{th}$ mode) on the compressional properties of cement, for cements with different Poisson's ratios. It is noted that method embodiments of the present invention are not restricted to the illustrated mode but may be performed using any other symmetric (S) or anti-symmetric (A) Lamb mode. It will be noted that the Lamb attenuation curves illustrated are functions of the Vp/Vs ratio (or Poisson's ratio) for the cement. It will further be noted that neither shear nor compressional properties of cement can be obtained based on the measurement of Lamb attenuation alone. For example, as shown in FIGS. 9 and 10, a value of $A_0$ attenuation of 30 dB/ft (horizontal dashed line 920) may correspond to multiple different cement compressional properties and multiple different cement shear properties. In fact, this particular attenuation value can be obtained even when fluid with certain properties is behind the casing. It should also be noted that the attenuation curves shown in FIGS. 9 and 10 are discontinuous. This discontinuity is due to the evanescence point. The determination of cement compressional properties and cement shear properties based on the Lamb attenuation curves is described below.

As mentioned above, method embodiments of the present invention involve using combinations of the above-described measurements to attain both compressional and shear properties of the cement behind the casing. In the below discussion, results obtained using the above-described model are employed, and the intent is to obtain both shear and compressional properties of one particular cement. Accordingly, for the purposes of this discussion, the following are taken as given:

(i) the value of the exponential term ($\alpha$) obtained from the pulse-echo measurement is 0.1 (as shown by the circled point 702 in FIG. 7), which corresponds to a cement compressional velocity of 2640 msec or cement compressional impedance of 4.75 MRayls (as shown by the vertical dashed line 710 in FIG. 7);

(ii) the measured value of the attenuation for the SH measurement is 16.3 dB/ft for mode $SH_0$ or 45.1 dB/ft for mode $SH_1$ (as shown by the circled points 802, 804 in FIG. 8), which correspond to a cement shear velocity of 1620 msec or cement shear impedance of 2.92 MRayls (as shown by the vertical dashed line 810 in FIG. 8);

(iii) the measured value of the attenuation for the Lamb $A_0$ measurement is 30 dB/ft (as shown by the horizontal dashed lines 920, 1020 in FIGS. 9 and 10, respectively).

According to method embodiments of the present invention, any of the following four combinations of measurements, (A)-(D), may be used.

(A) Combination of pulse-echo (or regular CBL measurement) and SH wave attenuation measurement. In this case, the compressional and shear properties of the cement may be directly and independently obtained from the pulse-echo and SH wave attenuation measurements, respectively, as described above in (1) and (2) with reference to FIGS. 6-8.

(B) Combination of SH measurement and Lamb measurement. In this case, first the value of cement shear properties is obtained from the SH wave attenuation measurement as described above in (2) with reference to FIG. 8. This value can then be used to obtain the Vp/Vs ratio from the Lamb wave attenuation measurement as shown in FIG. 9. Specifically, from among the multiple Lamb attenuation curves 951-957 identified by the legend 915, a Lamb attenuation curve is sought that has an attenuation of 30 dB/ft (i.e., the attenuation value obtained in the Lamb measurement—as indicated by the horizontal dashed line 920) corresponding to the cement shear properties obtained from the SH attenuation measurement (indicated by the vertical dashed line 910) or, in other words, a Lamb attenuation curve that has a value (point on the graph) satisfying the measured Lamb attenuation of 30 dB/ft (on the y axis) and the cement shear properties, namely, cement shear velocity of 1620 msec or cement shear impedance of 2.92 MRayls (on the x axis), obtained from the SH wave attenuation measurement. As shown by the circled point 902 (the intersection of the horizontal dashed line 920=measured attenuation, the vertical dashed line 910=obtained shear properties, and one of the Lamb attenuation curves 951-957) in FIG. 9, the Lamb attenuation curve 953 with a Vp/Vs ratio of 1.63 (Poisson's ratio of 0.2) fits this criterion, as indicated by the arrow 925 identifying that Lamb attenuation curve using the legend 915. Once this ratio is known, the compressional properties of the cement can be obtained: compressional velocity=1620 msec*1.63~2640 msec (i.e., Vs*Vp/Vs); compressional impedance=2.92 MRayls*1.63~4.75 MRayls.

Figure 11:
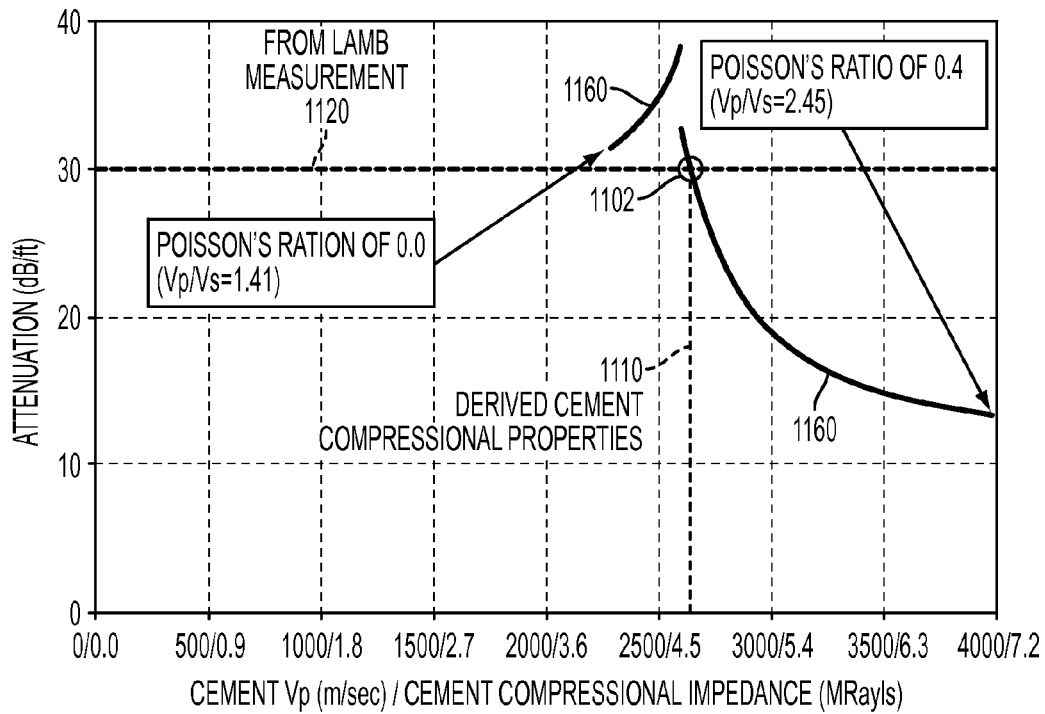
FIG. 11 is a graph illustrating Lamb wave ($A_0$ mode) attenuation as a function of cement compressional properties, for a constant cement shear velocity, in accordance with some embodiments.

FIG. 11 illustrates an alternative way of obtaining the cement compressional properties. FIG. 11 is a graph illustrating Lamb wave ($A_0$ mode) attenuation as a function of cement compressional properties, for a constant cement shear velocity (or shear impedance), in accordance with some embodiments. Since the cement shear properties in this case are known from the SH measurement, a Lamb attenuation curve can be generated corresponding to those known cement shear properties (shear velocity; shear impedance) and variable cement compressional velocities (or compressional impedances). Such a curve 1160 is illustrated in FIG. 11, which curve is specifically a Lamb $A_0$ mode attenuation curve for various cement compressional properties and constant cement shear velocity of 1620 msec (or constant cement shear impedance of 2.92 MRayls). (In FIG. 11, the values of Poisson's ratio of the cement are limited to the range from 0.0 to 0.4.) In this case, the cement compressional properties can be obtained as the (x-axis) value obtained at the intersection of the horizontal dashed line 1120 (indicating the attenuation value of 30 db/ft obtained from the measurement of the Lamb $A_0$ mode attenuation) and the illustrated Lamb attenuation curve 1160, as indicated by the circled point 1102 in FIG. 11. Accordingly, the obtained compressional properties (x-axis value) are labeled on the graph as "derived cement compressional properties" (indicated by vertical dashed line 1110). It will be noted that the values of the points on the curve 1160 in FIG. 11, corresponding to various compressional properties, may be obtained by multiplying the values of the shear properties at points on the selected Lamb curve 953 in FIG. 9 by Vp/Vs.

(C) Combination of pulse-echo (or regular CBL measurement) and Lamb measurement. First, the value of cement compressional properties is obtained from the pulse-echo measurement, as described above in (1) with reference to FIGS. 6 and 7. This value can then be used to obtain the Vp/Vs ratio from the Lamb attenuation measurement as shown in FIG. 10. Specifically, from among the multiple Lamb attenuation curves 1051-1057 identified by legend 1015, a Lamb attenuation curve is sought that has an attenuation of 30 dB/ft (i.e., the attenuation value obtained in the Lamb measurement—as indicated by the horizontal dashed line 1020) corresponding to cement compressional properties obtained from the pulse-echo measurement (indicated by the vertical dashed line 1010) or, in other words, a Lamb attenuation curve that has a value (point on the graph) satisfying the measured Lamb attenuation of 30 dB/ft (on the y axis) and the cement compressional properties, namely, cement compressional velocity of 2640 msec or cement compressional impedance of 4.75 MRayls (on the x axis), obtained from the pulse-echo measurement. As shown by the circled point 1002 (the intersection of the horizontal dashed line 1020=measured attenuation, the vertical dashed line 1010=obtained compressional properties, and one of the Lamb attenuation curves 1051-1057) in FIG. 10, the curve 1053 with a Vp/Vs ratio of 1.63 (Poisson's ratio of 0.2) fits this criterion, as indicated by the arrow 1025 identifying that Lamb attenuation curve using the legend 1015. Once this ratio is known, the shear properties of the cement can be obtained: shear velocity=2640 msec/1.63~1620 msec (Vp*Vs/Vp); shear impedance=4.75 MRayls/1.63~2.92 MRayls. With reference to FIG. 10, it will be noted that, while for modeled data this determination is possible, in practice the use of this particular method may be difficult since, as shown in the figure, it may occur that curves 1051-1057 with different Vp/Vs ratios for cements with various compressional properties are not very well separated. (Because curves 1051-1057 are not well separated in FIG. 10, reference numerals 1051-1057 are given only in the legend 1025, and the actual curves 1051-1057 on the graph are not labeled with their reference numbers.)

Figure 12:
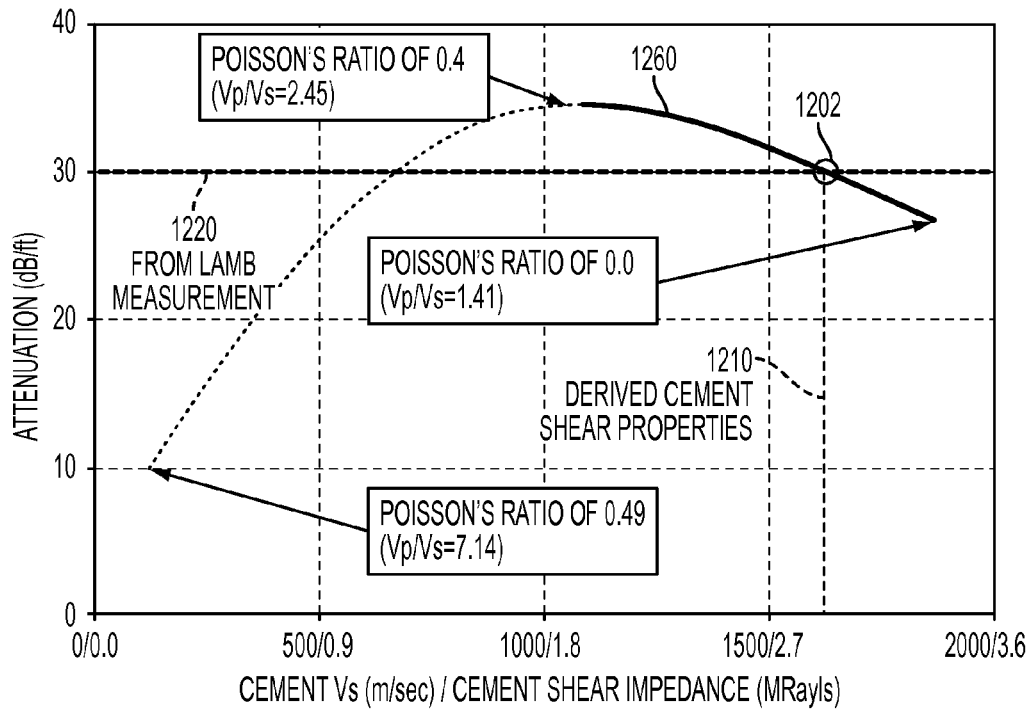
FIG. 12 is a graph illustrating Lamb wave ($A_0$ mode) attenuation as a function of cement shear properties, for a constant cement compressional velocity, in accordance with some embodiments.

FIG. 12 illustrates an alternative way of obtaining the cement shear properties. FIG. 12 is a graph illustrating Lamb wave ($A_0$ mode) attenuation as a function of cement shear properties, for a constant cement compressional velocity (or compressional impedance), in accordance with some embodiments. Since the cement compressional properties in this case are known from the pulse-echo measurement, a Lamb attenuation curve can be generated corresponding to those known cement compressional properties (compressional velocity; compressional impedance) and variable cement shear velocities (or shear impedances). Such a curve 1260 is illustrated in FIG. 12, which curve is specifically a Lamb $A_0$ mode attenuation for various cement shear properties and constant cement compressional velocity of 2640 msec (or constant cement compressional impedance of 4.75 MRayls). In this case, the cement shear properties can be obtained as the (x axis) value obtained at the intersection of the horizontal dashed line 1220 (indicating the attenuation value of 30 db/ft obtained from the measurement of the Lamb $A_0$ mode attenuation) and the illustrated Lamb attenuation curve 1260, as indicated by the circled point 1202 in FIG. 12. Accordingly, the obtained shear properties (x-axis value) are labeled on the graph as "derived cement shear properties" (indicated by vertical dashed line 1210). It will be noted that the values of the points on the curve 1260 in FIG. 12, corresponding to various shear properties, may be obtained by multiplying the values of the compressional properties at points on the selected Lamb curve 1053 in FIG. 10 by Vs/Vp.

(D) Combination of all three measurements. A combination of all three measurements, described above in (A)-(C), may be employed. In this case, the additional information obtained can be used, e.g., for quality control, to eliminate erroneous measurements, etc.

In view of the above discussion it will be noted that combinations (D) and (A) have certain advantages. Combination (A) incorporates two independent measurements of cement compressional and shear properties, while combination (D) further provides quality control. It will also be noted that combination (B) has certain advantages over combination (C). Since the curve illustrated in FIG. 12 is flat for cement Poisson's ratios in the range of 0 to 0.4, a very small error in the measured Lamb $A_0$ attenuation may produce a large apparent change in the cement compressional properties.

According to some embodiments of the present invention, the Lamb and SH measurements described above may be made using an electromagnetic acoustic transducer (EMAT), such as disclosed in U.S. Pat. No. 7,697,375 to Reiderman et al., having the same assignee as the present application, the contents of which are hereby incorporated herein by reference. However, the embodiments described herein are not limited to a particular tool or transducer, and any methods for exciting Lamb and SH waves may be used. The noted EMAT may be useful in determining the above-described cement properties in the case of lightweight cement (LWC). One of ordinary skill in the art will appreciate that various tools exist for performing standard CBL measurement and/or pulse-echo measurement. It may again be noted that any SH modes can be used to produce the estimation of shear velocity/impedance in cement (i.e. $SH_0$, $SH_1$, etc), and any Lamb modes ($A_0$, $S_0$, $A_1$, $S_1$, etc) can be used to obtain cement compressional velocity/impedance based on joint interpretation of the value of cement shear velocity/impedance obtained from the SH measurement and the attenuation value obtained from the Lamb measurement.

Figure 13:
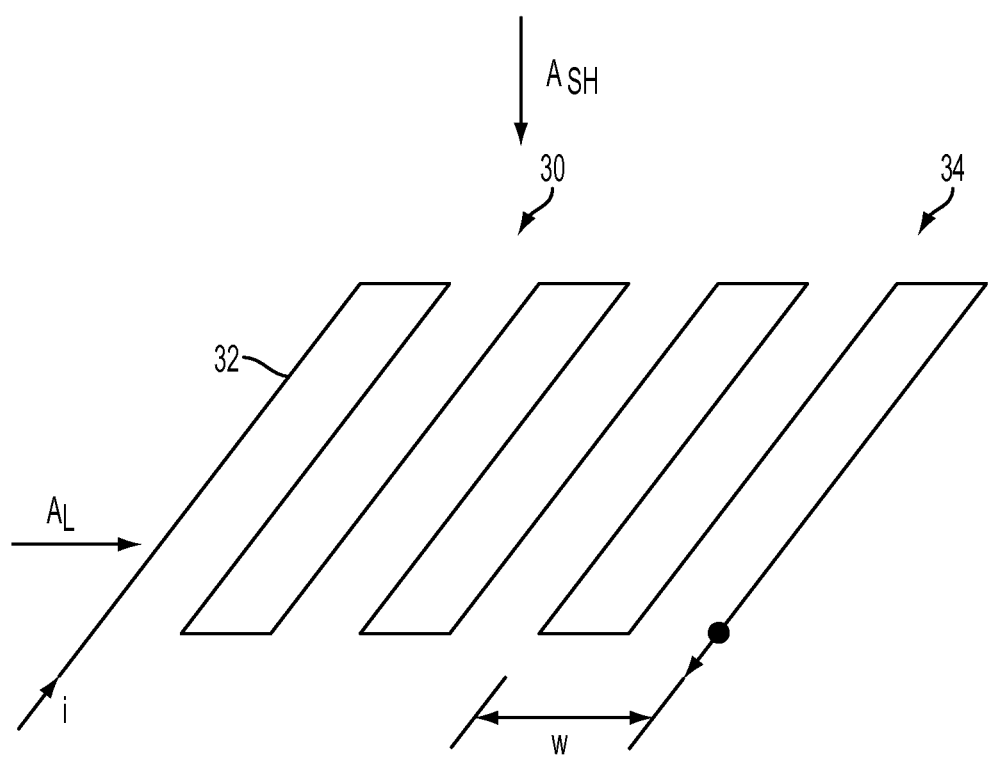
FIG. 13 is a schematic illustration of an electromagnetic acoustic transducer (EMAT) device, in accordance with some embodiments.

While the reader is referred to above-noted U.S. Pat. No. 7,697,375 incorporated herein by reference, nonetheless FIG. 13 provides a schematic, simplified illustration of an EMAT tool 30, in accordance with some embodiments. The principles of EMAT operation involve placing a wire near the surface of an electrically conducting object (magnetic or non-magnetic) and flowing current through the wire. This configuration induces eddy currents in the object by electromagnetic induction (based on the electromagnetic skin effect). In the presence of a static magnetic field (B) these induced eddy currents (J) experience Lorenz forces (f) given by vector product of those two fields:

$$f=J*B \qquad (3)$$

Through a variety of interactions, these Lorenz forces are transmitted into the object and serve as a source of acoustic waves. Depending on the mutual orientation of the fields one can use EMAT to generate shear waves or Lamb waves in a casing. As shown in FIG. 13, the EMAT tool 30 has associated magnetic fields ($A_L$, $A_{SH}$). In this simplified illustration of an EMAT 30 a wire 32 is shown formed into a series of loops 34. The EMAT 30 is in electrical communication with a current source (not shown) that provides a current i to the wire 32. Applying the static magnetic field $A_L$ when the EMAT 30 is disposed proximate to an object, such as the inner diameter of a section of casing 8 (FIG. 1), will in turn induce a Lamb wave within the casing 8. Similarly, if the static magnetic $A_{SH}$ field is applied to a section of casing 8, a shear wave can be induced within the casing 8.

As is known in the art, the wavelength of Lamb waves produced by EMAT devices is dependent upon the width W of the coil loops 34 within the EMAT 30. Typically there is a one to one relationship between the width W of the coil loop 34 and the wavelength of the Lamb wave produced by the EMAT 30. Thus the Lamb wave wavelength produced by a specific EMAT can be controlled by controlling the width W of the coil loop 34.

Figure 14:
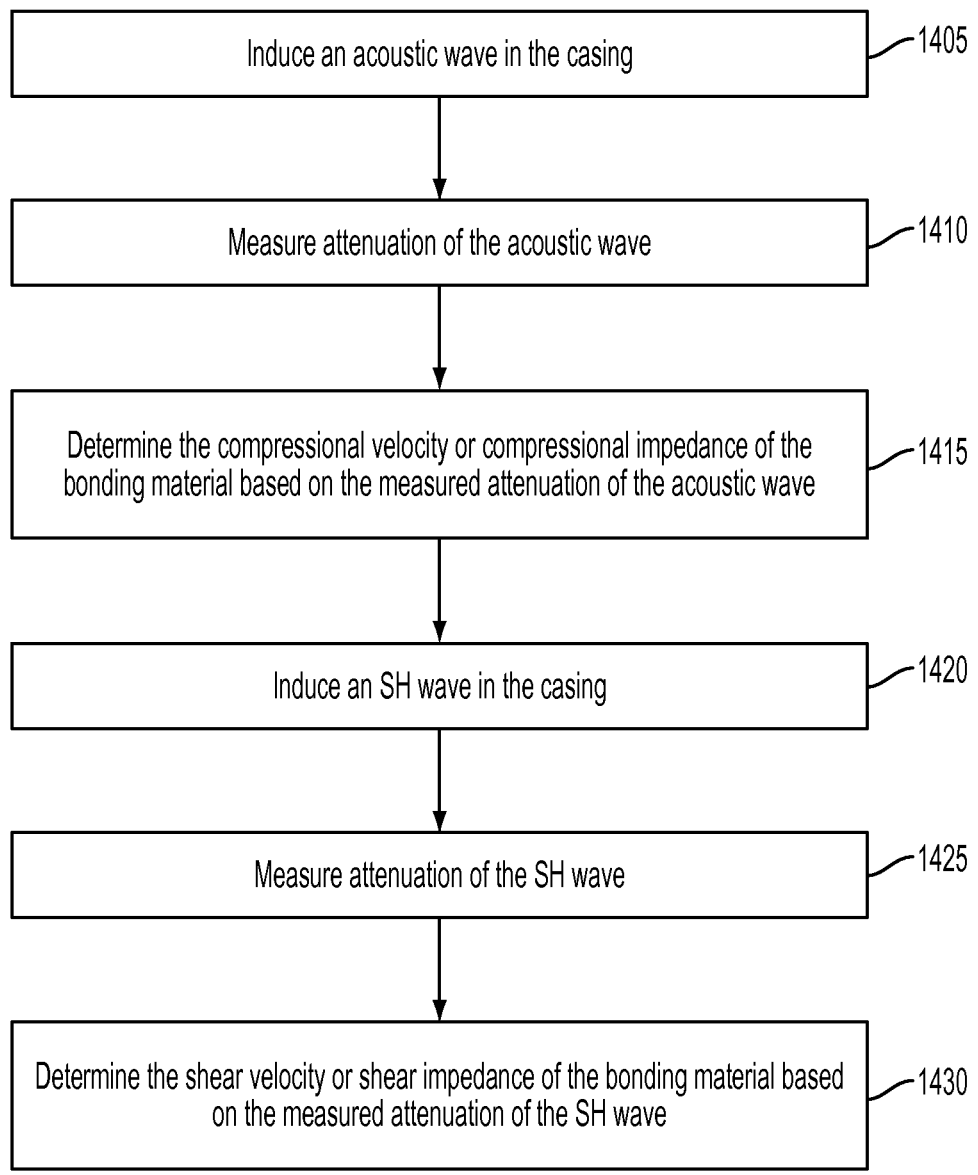
FIG. 14 is a flow chart illustrating a method of determining properties of a bonding material disposed outside of a casing in a borehole, using a cement bond logging measurement and an SH wave attenuation measurement, in accordance with some embodiments.
Figure 15:
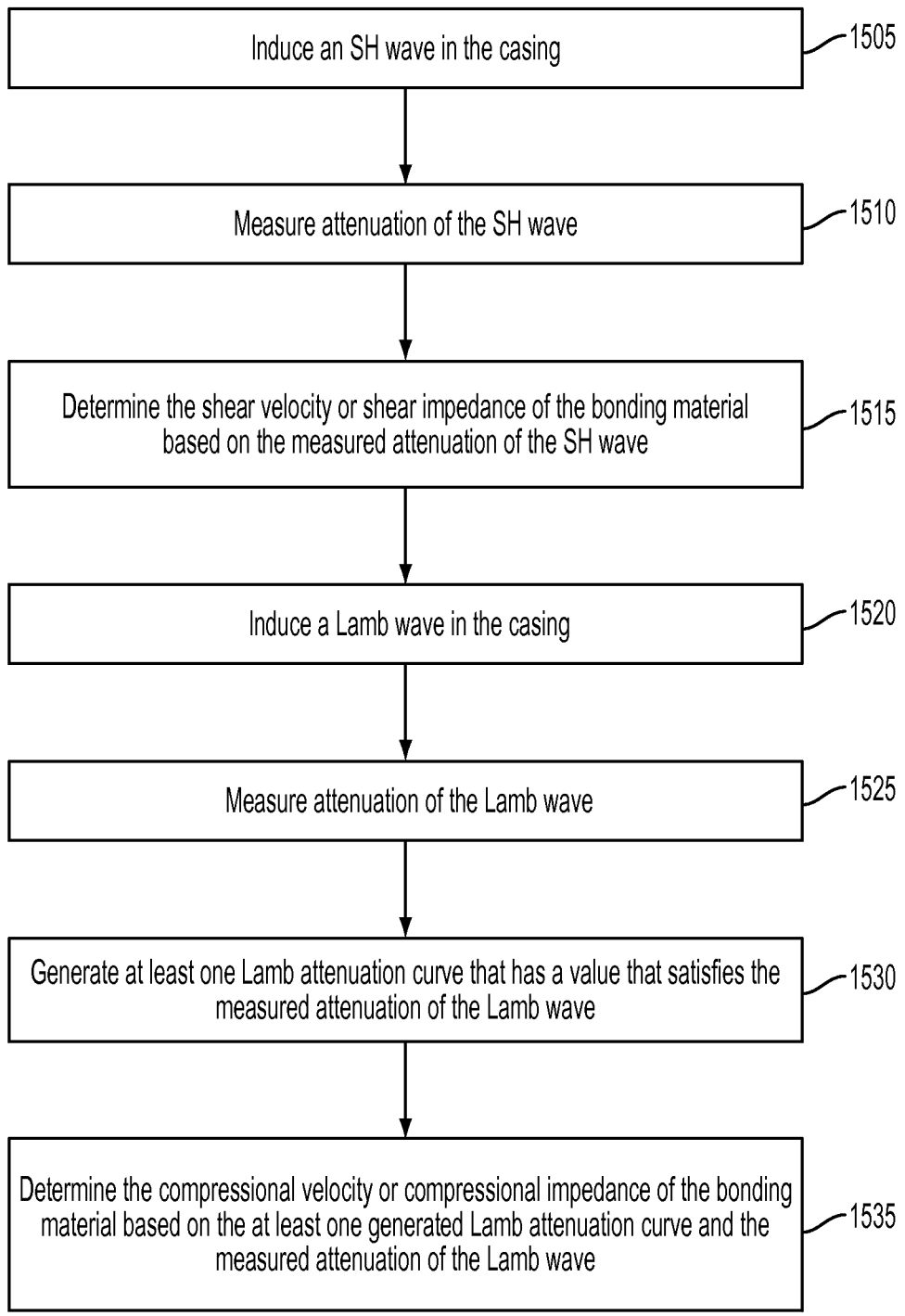
FIG. 15 is a flow chart illustrating a method of determining properties of a bonding material disposed outside of a casing in a borehole, using an SH wave attenuation measurement and a Lamb wave attenuation measurement, in accordance with some embodiments.
Figure 16:
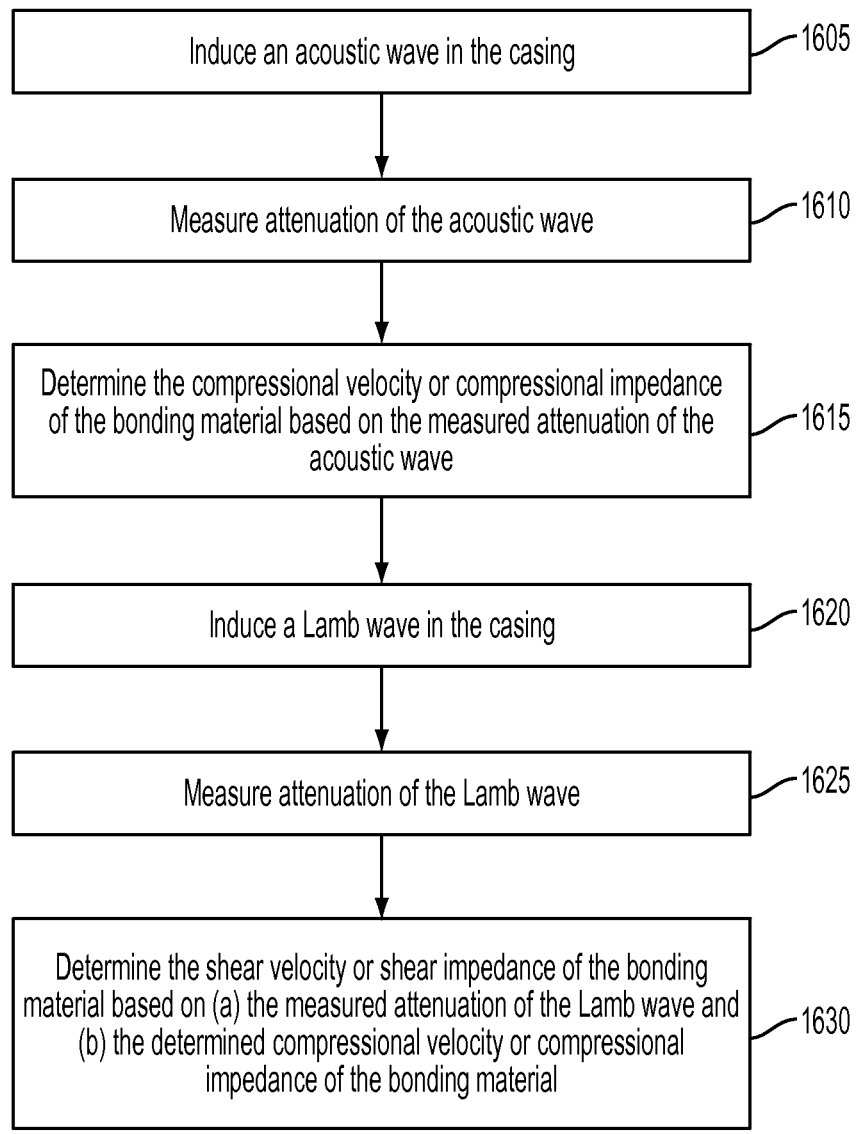
FIG. 16 is a flow chart illustrating a method of determining properties of a bonding material disposed outside of a casing in a borehole, using a cement bond logging measurement and a Lamb wave attenuation measurement, in accordance with some embodiments.

FIGS. 14-16 are flow charts illustrating methods of determining properties of a bonding material disposed outside of a casing in a borehole, in accordance with some embodiments. According to the flow chart of FIG. 14, the method uses a regular cement bond logging (e.g., pulse echo) measurement and an SH wave attenuation measurement, in accordance with some embodiments. According to the flow chart of FIG. 15, the method uses an SH wave attenuation measurement and a Lamb wave attenuation measurement, in accordance with some embodiments. According to the flow chart of FIG. 16, the method uses a regular cement bond logging (e.g., pulse echo) measurement and a Lamb wave attenuation measurement, in accordance with some embodiments. FIGS. 14-16 correspond to above-described combinations (A)-(C), respectively.

Referring to FIG. 14, at step 1405, an acoustic wave is induced in the casing. At step 1410, attenuation of the acoustic wave is measured. Steps 1405 and 1410 may be performed, e.g., using a CBL tool, e.g., a pulse echo transducer. At step 1415, the compressional velocity or compressional impedance of the bonding material is determined based on the measured attenuation of the acoustic wave. At step 1420, an SH wave is induced in the casing. At step 1425, attenuation of the SH wave is measured. Steps 1420 and 1425 may be performed, e.g., using an EMAT tool. At step 1430, the shear velocity or shear impedance of the bonding material is determined based on the measured attenuation of the SH wave.

Referring to FIG. 15, at step 1505, an SH wave is induced in the casing. At step 1510, attenuation of the SH wave is measured. Steps 1505 and 1510 may be performed, e.g., using an EMAT tool. At step 1515, the shear velocity or the shear impedance of the bonding material is determined based on the measured attenuation of the SH wave. At step 1520, a Lamb wave is induced in the casing. At step 1525, attenuation of the Lamb wave is measured. Steps 1520 and 1525 may be performed, e.g., using an EMAT tool. At step 1530, at least one Lamb attenuation curve is generated that has a value that satisfies the measured attenuation of the Lamb wave. The at least one generated Lamb attenuation curve may have a value that satisfies the determined shear velocity or shear impedance of the bonding material. At step 1535, the compressional velocity or the compressional impedance of the bonding material is determined based on the at least one generated Lamb attenuation curve and the measured attenuation of the Lamb wave. Specifically, the compressional velocity or compressional impedance of the bonding material may be calculated using a ratio of the compressional velocity to the shear velocity of the at least one generated Lamb attenuation curve and the determined shear velocity or shear impedance of the bonding material. Alternatively, the at least one generated Lamb attenuation curve may correspond to multiple compressional velocities, and the determination of the compressional velocity or compressional impedance of the bonding material based on the at least one generated Lamb attenuation curve and the measured attenuation of the Lamb wave may be performed by identifying an intersection of the at least one generated Lamb attenuation curve and the measured attenuation of the Lamb wave.

Referring to FIG. 16, at step 1605, an acoustic wave is induced in the casing. At step 1610, attenuation of the acoustic wave is measured. Steps 1605 and 1610 may be performed, e.g., using a CBL tool, e.g., a pulse echo transducer. At step 1615, the compressional velocity or compressional impedance of the bonding material is determined based on the measured attenuation of the acoustic wave. At step 1620, a Lamb wave is induced in the casing. At step 1625, attenuation of the Lamb wave is measured. Steps 1620 and 1625 may be performed, e.g., using an EMAT tool. At step 1630, the shear velocity or shear impedance of the bonding material is determined based on (a) the measured attenuation of the Lamb wave and (b) the determined compressional velocity or compressional impedance of the bonding material. The determination of the shear velocity or shear impedance of the bonding material may be performed by selecting a Lamb attenuation curve that has a value that satisfies (c) the measured attenuation of the Lamb wave and (d) the determined compressional velocity or compressional impedance of the bonding material. Alternatively, the determination of the shear velocity or shear impedance of the bonding material may be performed by (e) generating a Lamb attenuation curve that corresponds to (i) the determined compressional velocity or compressional impedance of the bonding material and (ii) multiple shear velocities, and (f) identifying an intersection of the generated Lamb attenuation curve with the measured Lamb attenuation.

Consistent with the above discussion of combination (D), the method of FIG. 14 may further include inducing and measuring attenuation of a Lamb wave and making applicable determinations based thereon, the method of FIG. 15 may further include inducing and measuring attenuation of an acoustic wave and making applicable determinations based thereon, and the method of FIG. 16 may further include inducing and measuring attenuation of an SH wave and making applicable determinations based thereon.

As will be understood by one of ordinary skill in the art, with respect to each of FIGS. 14-16, the ordering of some of the steps may be varied and some of the steps may be performed in parallel.

With reference to all the methods discussed herein, once cement compressional impedance or compressional velocity and cement shear impedance or shear velocity are known, properties indicative of the strength of the cement may be determined based on those known quantities, as will be readily understood by one of ordinary skill in the art. Such properties indicative of the strength of the cement include, e.g., bulk modulus, shear modulus, and Young's modulus. By knowing such properties indicative of the strength of the cement, more informed and hence improved decisions can be made as to actions to be taken with respect to the well (e.g., further drilling, further logging, plugging and abandonment, etc.).

According to embodiments of the present invention, a particular mode of the Lamb or SH wave to be induced may be selected depending on a known or estimated density of the bonding material. For example, for lightweight cement, the SH attenuation curves shift downward, which means the $SH_0$ mode has less sensitivity than the $SH_1$ mode. Thus, for lightweight cement it may be more preferable to employ the $SH_1$ mode than the $SH_0$ mode.

According to embodiments of the present invention, either of the Lamb and SH waves may be induced in the casing in such a manner as to cause the wave to propagate in an axial, circumferential, helical, or other direction along the casing, as will be understood by one of ordinary skill in the art.

While the above description has been given with reference to cement disposed outside of a cased borehole, one of ordinary skill in the art will appreciate that the embodiments described herein are also applicable to other kinds of bonding materials, including cement having additives, such as glass beads, etc.

Data (e.g., attenuation measurements, cement properties, etc.) obtained by the methods described herein, or logs compiled from such data, may be fed into a system for performing tasks such as data acquisition, processing, analysis, management and transmission. Such data may be needed by decision makers tasked with deciding what actions are to be taken with respect to a well that has been (initially) drilled and logged. Such decisions may be critical and may be needed to be made quickly, with mistakes or delay entailing undue costs. The decision makers as well as individuals tasked with interpreting the data may be located remotely from the site at which the data is obtained, and it may not be feasible to (timely) transport those parties to that location. It is also critical to maintain confidentiality of the data. Accordingly, embodiments of the present invention may include such systems for data acquisition, processing, analysis, management and transmission.

Figure 17:
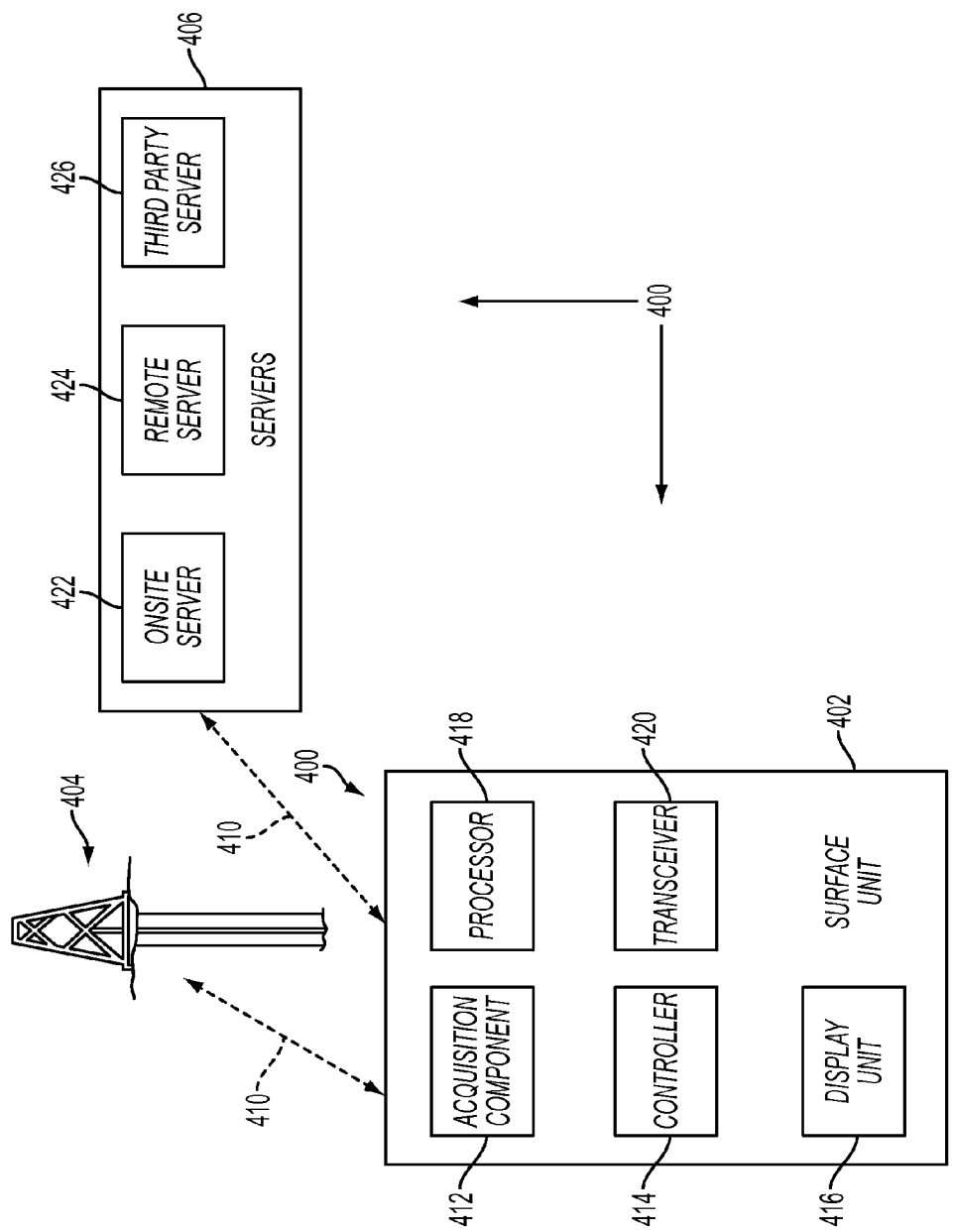
FIG. 17 is a schematic illustration of a system for acquiring, processing, analyzing, managing and transmitting data obtained from a well, in accordance with some embodiments.

FIG. 17 is a schematic illustration of such a data acquisition, processing, analysis, management and transmission system. As shown in the figure, system 400 includes a surface unit 402 operatively connected to a wellsite drilling system 404, and servers 406 operatively linked to the surface unit 402. As further shown, system 400 may also include communication links 410 between wellsite drilling system 404, surface unit 402, and servers 406. A variety of links may be provided to facilitate the flow of data through system 400. For example, communication links 410 may provide for continuous, intermittent, one-way, two-way and/or selective communication throughout system 400. Communication links 410 may be of any type, such as wired, wireless, etc.

Details of wellsite drilling system 404 may be as described with reference to FIG. 1, and surface unit 402 may be a surface truck such as described with reference to FIG. 1. Surface unit 402 may be provided with an acquisition component 412, a controller 414, a display unit 416, a processor 418 and a transceiver 420. Acquisition component 412 collects and/or stores data obtained from the well using downhole tools 14. It will be noted that wireline 10 (FIG. 1) may serve not only as a power cable for conveying downhole tools 14 but also as a data transmission cable or communication medium for transmitting data obtained by downhole tools 14 to acquisition component 412 of surface unit 402.

Controller 414 may be enabled to enact commands at the well. Controller 414 may be provided with actuation means that can perform drilling operations, such as steering, advancing, or otherwise taking action at the wellsite. Commands may be generated based on logic of processor 418, or by commands received from other sources. Processor 418 may be provided with features for manipulating and analyzing the obtained data, including performing the determinations, calculations, etc. described herein and related or supporting actions, as will be understood by one of ordinary skill in the art. Processor 418 may be provided with additional functionality to perform operations in the well.

Display unit 416 may be provided at the wellsite and/or at remote locations (not shown) for viewing the data. The data represented by display unit 416 may be raw data, processed data and/or data outputs generated from various data. A user may determine a desired course of action during or after drilling, based on reviewing the displayed data. The drilling operation may be selectively adjusted in response to reviewing the displayed data. Data and aspects of the drilling operation may be viewed in real-time or near real-time on display unit 416.

Transceiver 420 provides a means for providing data access to and/or from other sources. Transceiver 420 also provides a means for communicating with other components, such as servers 406, the wellsite drilling system 404, and surface unit 402.

Servers 406 may include any of onsite server(s) 422, remote server(s) 424, and third party server(s) 426. Onsite server 422 may be positioned at the wellsite and/or other locations for distributing data from surface unit 402. Remote server 424 may be positioned at a location away from the well and may provide data from remote sources. Third party server 426 may be onsite or remote, but is operated by a third party.

Servers 406 may be capable of transferring drilling data, such as logs, drilling events, trajectory, and/or other oilfield data, such as seismic data, historical data, economics data, or other data that may be of use during analysis. The type of server shall not be construed to limit the present invention, but rather system 400 may be adapted to function with different types of servers such as will be understood by one of ordinary skill in the art.

Servers 406 may collect a wide variety of data. The data may be collected from a variety of channels that provide a certain type of data, such as well logs. The data from the servers may be passed to analysis and management tools/software for applicable processing and use in making decisions regarding the well, which decisions may be made by decision makers remote from the well. Servers 406 may also be used to store and/or transfer data.

With respect to the various instances of data transmission mentioned above with reference to the system of FIG. 17, any means of transmission known to one of ordinary skill in the art may be employed.

In view of the above discussion, it will be understood that the methods described herein may be carried out by a machine such as processor 418 and/or controller 414, executing instructions, which may be implemented in software, firmware, hardware, or any combination thereof, and which may be contained in an article of manufacture comprising a computer-accessible or computer-readable medium, the instructions causing the machine to perform the method when the instructions are executed by the machine.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, reordered, or otherwise altered. Similarly, this disclosure describes one or more embodiments wherein various operations are performed by certain systems, applications, module, components, etc. In alternative embodiments, however, those operations could be performed by different components. Also, items such as applications, module, components, etc. may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware.

Further, each of the method embodiments set forth above, including all combinations of method embodiments, may also be instantiated as an article of manufacture embodiment, wherein an article of manufacture comprises a non-transitory machine-accessible medium containing instructions, wherein the instructions, when executed by the machine, cause the machine to perform the respective method.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method of determining properties of a bonding material disposed outside of a casing in a borehole, comprising:
   inducing an SH wave in the casing;
   measuring attenuation of the SH wave;
   determining the shear velocity or the shear impedance of the bonding material based on the measured attenuation of the SH wave;

inducing a Lamb wave in the casing;
measuring attenuation of the Lamb wave;
generating at least one Lamb attenuation curve that has a value that satisfies the measured attenuation of the Lamb wave; and
determining the compressional velocity or the compressional impedance of the bonding material based on the at least one generated Lamb attenuation curve and the measured attenuation of the Lamb wave.

2. A method according to claim 1, wherein the bonding material is cement.

3. A method according to claim 1, wherein the inducing of at least one of the SH or Lamb wave in the casing and the measuring of the attenuation of at least one of the SH or Lamb wave is performed using an electromagnetic acoustic transducer.

4. A method according to claim 1, further comprising:
determining a property indicative of strength of the bonding material, based on at least one of (a) the determined compressional velocity or compressional impedance and (b) the determined shear velocity or shear impedance.

5. A method according to claim 1, further comprising selecting a particular mode of at least one of the SH wave to be induced and the Lamb wave to be induced, depending on a known or estimated density of the bonding material.

6. A method according to claim 1, wherein at least one of the following holds:
(a) the inducing of the SH wave in the casing comprises causing the SH wave to propagate in an axial, circumferential, or helical direction along the casing; and
(b) the inducing of the Lamb wave in the casing comprises causing the Lamb wave to propagate in an axial, circumferential, or helical direction along the casing.

7. A method according to claim 1, wherein the at least one generated Lamb attenuation curve has a value that satisfies the determined shear velocity or shear impedance of the bonding material.

8. A method according to claim 7, wherein the determining of the compressional velocity or compressional impedance of the bonding material based on the at least one generated Lamb attenuation curve and the measured attenuation of the Lamb wave comprises calculating the compressional velocity or compressional impedance of the bonding material using a ratio of the compressional velocity to the shear velocity of the at least one generated Lamb attenuation curve and the determined shear velocity or shear impedance of the bonding material.

9. A method according to claim 1,
wherein the at least one generated Lamb attenuation curve corresponds to multiple compressional velocities, and
wherein the determining of the compressional velocity or compressional impedance of the bonding material based on the at least one generated Lamb attenuation curve and the measured attenuation of the Lamb wave comprises identifying an intersection of the at least one generated Lamb attenuation curve and the measured attenuation of the Lamb wave.

10. A method of determining properties of a bonding material disposed outside of a casing in a borehole, comprising:
inducing an acoustic wave in the casing;
measuring attenuation of the acoustic wave;
determining the compressional velocity or compressional impedance of the bonding material based on the measured attenuation of the acoustic wave;
inducing a Lamb wave in the casing;
measuring attenuation of the Lamb wave; and
determining the shear velocity or shear impedance of the bonding material based on (a) the measured attenuation of the Lamb wave and (b) the determined compressional velocity or compressional impedance of the bonding material,
wherein the determining of the shear velocity or shear impedance of the bonding material based on (a) the measured attenuation of the Lamb wave and (b) the determined compressional velocity or compressional impedance of the bonding material comprises:
generating a Lamb attenuation curve that corresponds to (c) the determined compressional velocity or compressional impedance of the bonding material and (d) multiple shear velocities; and
identifying an intersection of the generated Lamb attenuation curve with the measured Lamb attenuation.

11. A method according to claim 10, wherein the bonding material is cement.

12. A method according to claim 10, wherein the inducing of the acoustic wave in the casing and the measuring of the attenuation of the acoustic wave comprise making a pulse echo measurement.

13. A method according to claim 10, wherein the inducing of the Lamb wave in the casing and the measuring of the attenuation of the Lamb wave is performed using an electromagnetic acoustic transducer.

14. A method according to claim 10, further comprising:
determining a property indicative of strength of the bonding material, based on at least one of (c) the determined compressional velocity or compressional impedance and (d) the determined shear velocity or shear impedance.

15. A method according to claim 10, further comprising selecting a particular mode of the Lamb wave to be induced depending on a known or estimated density of the bonding material.

16. A method according to claim 10, wherein the inducing of the Lamb wave in the casing comprises causing the Lamb wave to propagate in an axial, circumferential, or helical direction along the casing.

17. A method according to claim 10, further comprising:
inducing an SH wave in the casing;
measuring attenuation of the SH wave; and
determining the shear velocity or shear impedance of the bonding material based on the measured attenuation of the SH wave.

* * * * *